Figure 1:
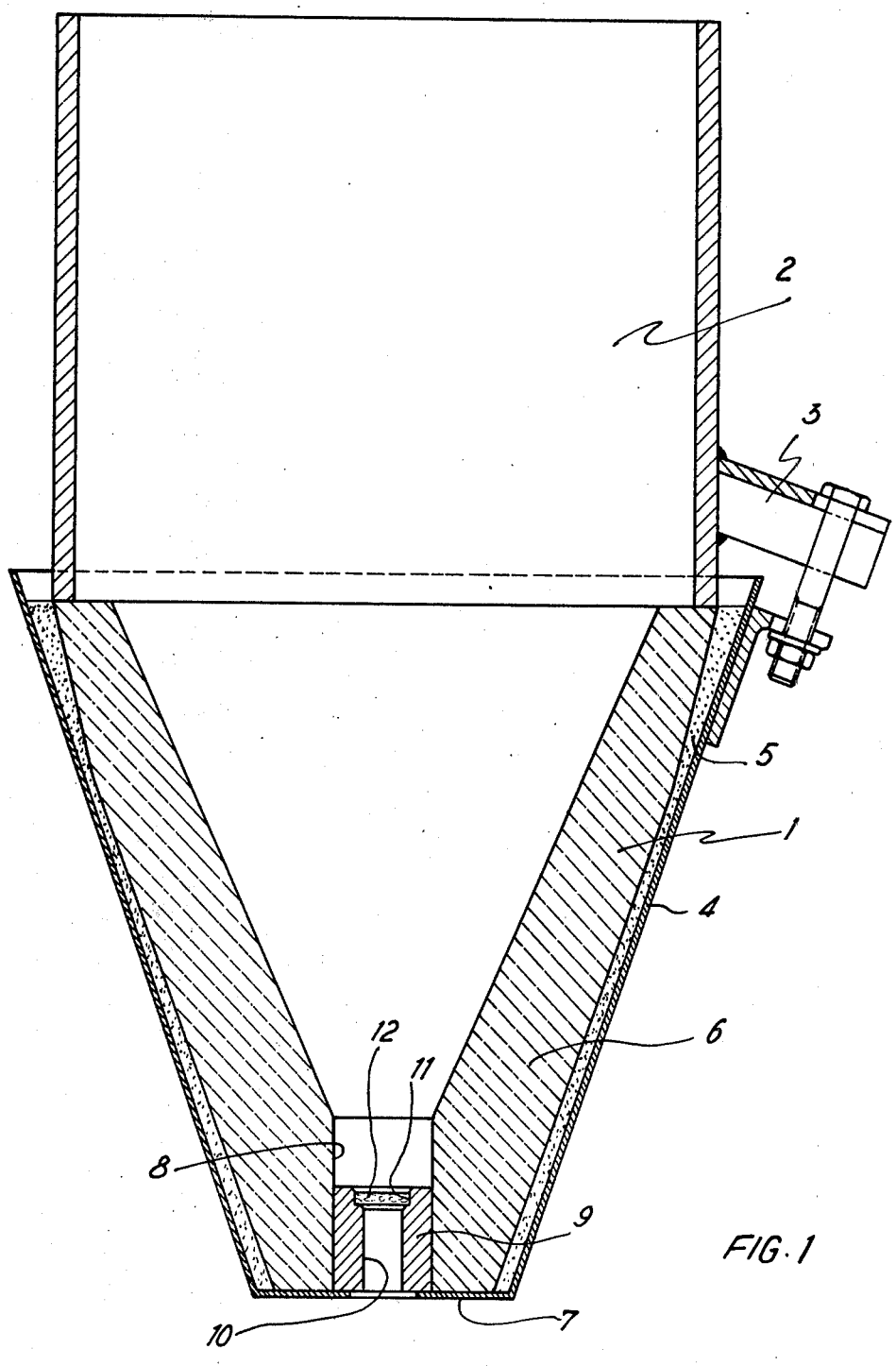

United States Patent [19]

de Savigny

[11] 4,149,704

[45] Apr. 17, 1979

[54] SELF-OPENING CLOSURE FOR THE DISCHARGE APERTURE OF A CRUCIBLE

[75] Inventor: Dominique de Savigny, Neuilly-sur-Seine, France

[73] Assignee: Acieries de Gennevilliers Anciens Establissements C. Delachaux, Neuilly-sur-Seine, France

[21] Appl. No.: 478,671

[22] Filed: Jun. 12, 1974

[30] Foreign Application Priority Data

Jun. 20, 1973 [FR] France ................................ 73 22413

[51] Int. Cl.² ............................................... C21C 7/00
[52] U.S. Cl. ..................................... 266/167; 266/271; 75/27
[58] Field of Search ............... 75/27; 266/34 R; 49/1; 266/38; 164/53, 54; 428/443

[56] References Cited

U.S. PATENT DOCUMENTS

| 2,024,132 | 12/1935 | Sander | 75/27 |
| 2,253,364 | 8/1941 | Cohen | 75/27 |
| 3,831,915 | 8/1974 | Guntermann | 75/27 |

Primary Examiner—M. J. Andrews
Attorney, Agent, or Firm—Alan H. Levine

[57] ABSTRACT

A self-opening closure for the discharge aperture of a crucible containing an aluminothermic mixture for welding, the closure comprising a pellet of a solid, e.g. asbestos, having good mechanical resistance and which is not degassed by heating, a thermal conductivity below 2 kcal/m.h. ° C. and a fusion temperature below 1600° C. The discharge aperture is formed in a detachable socket, one end of the discharge aperture having a part with a greater diameter to receive the pellet which forms the closure.

5 Claims, 4 Drawing Figures

SELF-OPENING CLOSURE FOR THE DISCHARGE APERTURE OF A CRUCIBLE

This invention relates to the discharge aperture of an aluminothermic welding crucible, and particularly to closures for their discharge apertures.

The principle of aluminothermic welding (e.g. thermite welding) is well known. It consists of using the heat released by the reaction of the formation of alumina from its constituents to obtain the molten welding metal. In order to put this process into operation it is usual to react the welding metal in the form of its oxide with the aluminium in a crucible, the reaction being set off by known means such as a localised raising of the temperature. When all the mass is melted, the discharge aperture of the crucible is opened and the welding metal spills out into a crucible which contains the elements for welding.

The moment at which the discharge aperture is opened is very important in this process. In fact, if it occurs too soon the decantation between alumina and molten metal is incomplete and in the opposite case, discharging too late results in cooling of the metal and an insufficient pouring temperature.

The devices used up to now for discharging crucibles were mechanical and often manually operated on the basis of empirical observations, so they could lack precision, apart from the fact that they necessitated an operator.

The present invention proposes a self-opening closure which opens at the optimum moment because the opening is conditioned by the temperature of the bath and the end of the reaction. This constitutes an important advantage and makes it possible to overcome, to a certain extent, the disadvantages of the earlier process, for example the differences in the firing times over a batch. In addition this device has the advantage of being adaptable and reproducible.

In accordance with the present invention a crucible for aluminothermic welding has at the bottom a discharge aperture closed by a self-opening closure comprising a pellet adapted to be melted by the aluminothermic reaction to open the discharge opening and discharge the contents of the crucible automatically.

The present invention proposes a self-opening closure for the discharge aperture of a crucible containing an aluminothermic mixture for welding, the said closure for the discharge aperture consisting of a pellet of a solid which has good mechanical resistance, is not degassed by heating, has a thermal conductivity below 2 kcal/m.h. ° C. and has a fusion temperature below 1600° C.

Although the applicants do not wish to be limited in their invention by a theoretical interpretation of the phenomenon it seems, after tests with various materials such as in particular metals, wood, compositions of the pyrotechnic type and asbestos that the fusion of the closure must be delayed by a low thermal conductivity in order to obtain a usable closure. Thus, metals which are good conductors of heat such as steel are not suitable because they melt rapidly when their fusion point is reached even if the superheat is only localised and temporary, the opening times are therefore not very reproducible, moreover the thickness of the closure does not constitute a parameter acting on the opening time as opposed to the device according to the preferred form of the invention wherein the delay is proportional to the thickness of the closure.

In one embodiment the solid pellet consists of an asbestos pellet, preferably of a CP asbestos board sold by the firm CARTERON, the characteristics of the said board being given below.

This CP board contains 98 to 99% asbestos consisting of asbestos fibres from Canada (chrysotile fibres) and is a solid with a density in the region of 1.04, tensile strength of 0.7 kg/mm$^2$, a fusion temperature of 1450° C. and a loss in firing by calcination of the order of 15%.

However, when putting the device into operation using a single pellet, it was noticed that if the results obtained—that is to say, insofar as the welding is concerned—were perfectly satisfactory, it was observed on the other hand that, owing to a phenomenon not fully explained, after the same crucible had been used a certain number of times the inner walls of the crucible showed deterioration in the region of the pellet.

This is why the preferred embodiment of the automatically opening closure is surmounted by a chimney containing an aluminothermic mixture. This aluminothermic mixing chimney preferably consists of a metal tube covering the solid pellet and filled with aluminothermic mixture.

Preferably the solid pellet which forms the closure is arranged at the bottom of a metal tube filled with aluminothermic mixture and closed at both ends. Preferably the metal tube has thin walls of iron, steel, or preferably of aluminium. This tube will advantageously have a flat base, i.e. it will be a tube of the "aspirin tube" type. The pellet will be deposited on this flat end, the tube will then be filled with the aluminothermic mixture and then closed at the top end, for example by crushing.

In a preferred embodiment of the device according to the invention and in order to facilitate the positioning of the solid pellet, the discharge aperture of the aluminothermic crucible is a hole drilled in a detachable socket. The discharge aperture drilled in this socket has a part of greater diameter at one end to permit the solid pellet according to the invention to be positioned in the socket on the exterior of the crucible.

This latter device is put into operation as follows:

a crucible provided with a detachable socket is used, as already described;

the device, which is surmounted by its chimney with the asbestos pellet in the lower part of the chimney, is placed in the socket, that is to say it rests on the part of the discharge aperture drilled in the socket having the greater diameter;

a certain thickness of a refractory mixture such as a corundum powder is spread round the aluminothermic mixing chimney in order to insulate the chimney from the lateral walls of the crucible which face it, avoiding covering the upper part of the chimney with the refractory powder;

the mass of the proper aluminothermic mixture is then poured into the crucible.

It has been shown that this device retains all the advantageous characteristics of a device using a simple pellet and, in addition, the crucibles last as long as the crucibles using the known closing devices.

As used herein the term "solid having a good mechanical resistance" means a solid capable of supporting the charge contained in a crucible for alumonothermy; and the term "not degassable by heating" means a solid which does not give off water vapour when heated, thus which absorbs no or only a little humidity, but which moreover, in aluminothermic conditions, does not decompose or react on the components of the bath while encouraging the formation of gas; the term "low thermal conductivity" means a thermal conductivity below 2 kcal/m.h. ° C. and preferably below 0.5 kcal/m.h. ° C.

The fusion temperature of the solid used in the device according to the invention must be below 1600° C. and is preferably between 1300° and 1600° C.

One of the principal advantages of the device according to the invention lies in the fact that in the temperature range concerned in aluminothermy there is a substantially linear relationship between the thickness of the solid pellet and the discharging time, which makes it possible to optimise the use of the aluminothermic crucible.

Figure 2:
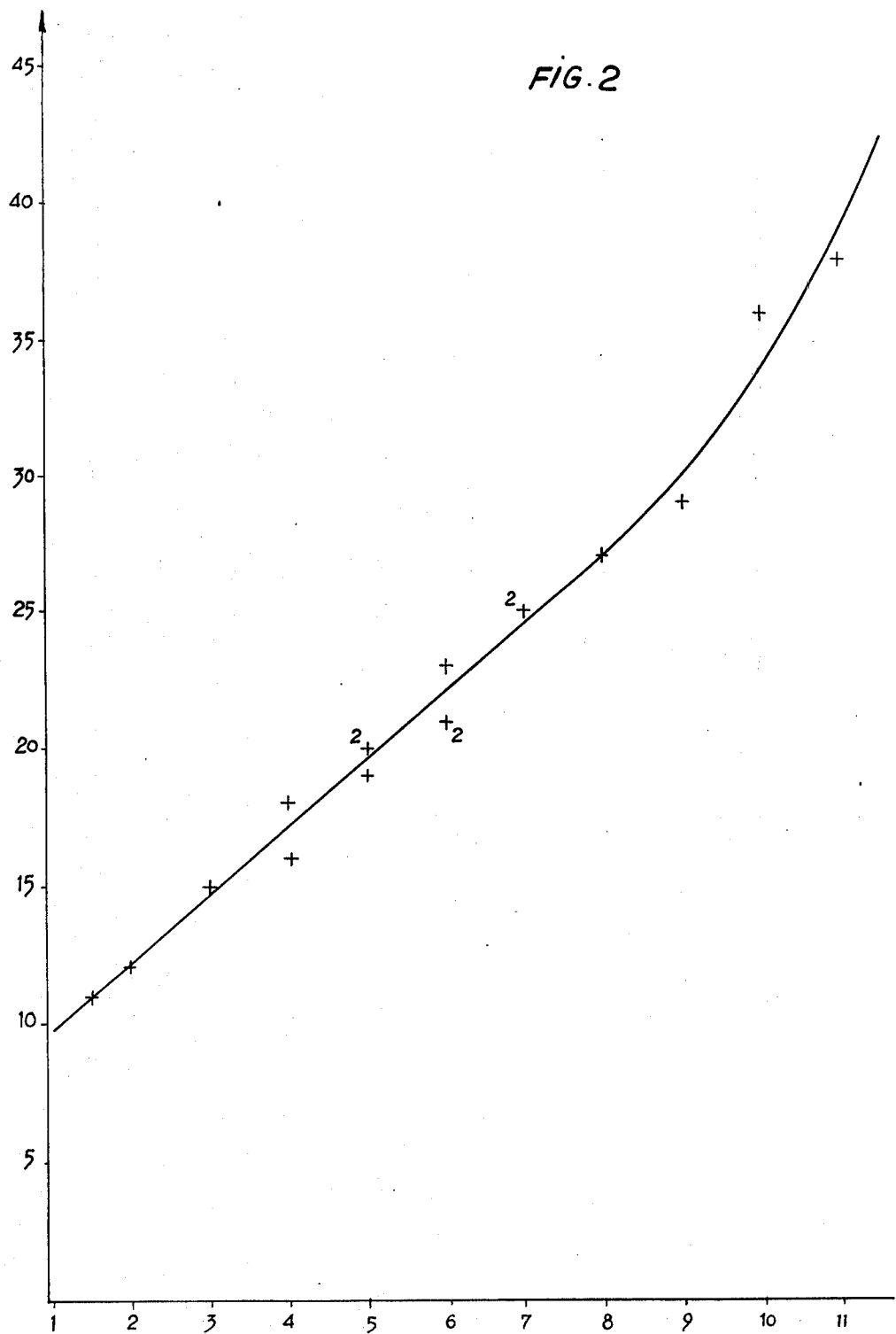
Figure 3:
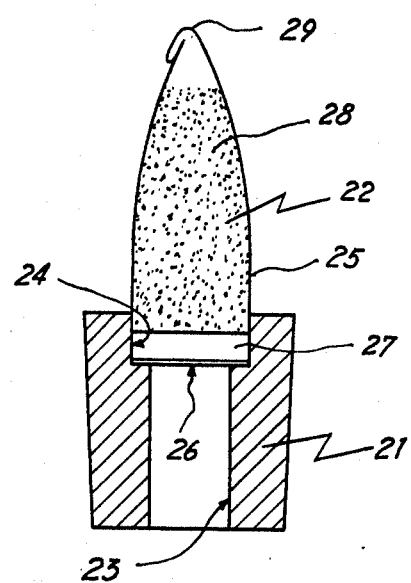
Figure 4:
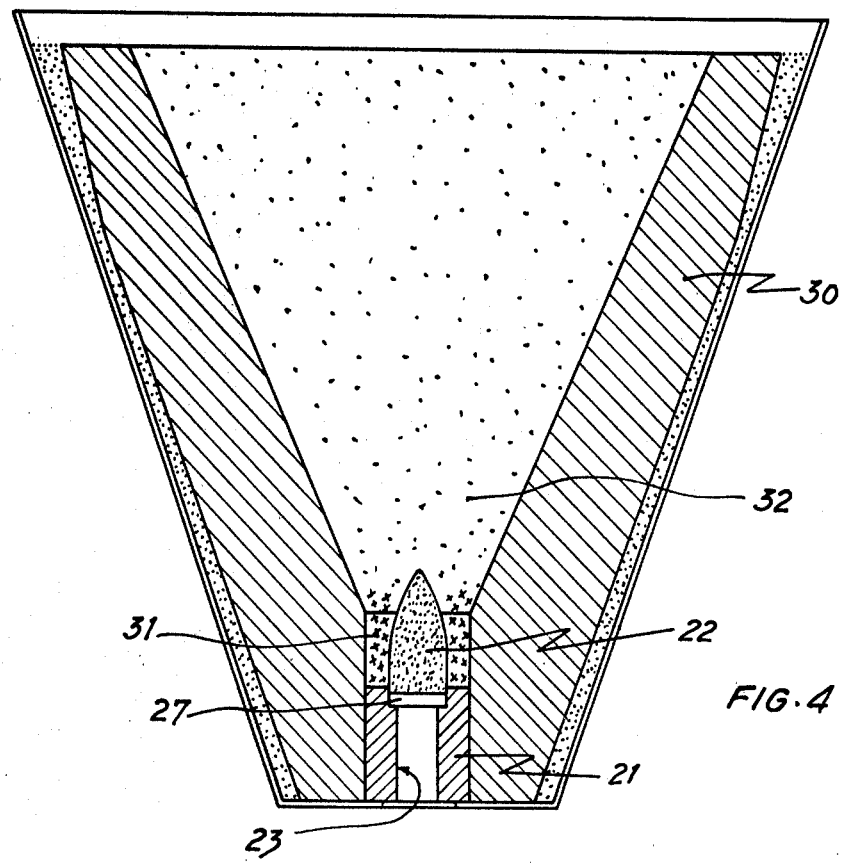

The present invention will now be fully described, with the aid of an example which does not limit it in any way and with reference to the accompanying drawings, wherein:

FIG. 1 shows a crucible for thermic welding, provided with a discharge device according to the invention, and FIG. 2 is a graph showing the evolution of the discharging time plotted against the thickness of the pellet for a given charge, FIG. 3 shows another embodiment of the device according to the invention, FIG. 4 shows a crucible provided with the device according to FIG. 1.

FIG. 1 shows a crucible 1 on which is secured, with the aid of a fixing device 3, a raised part 2. The crucible is of a substantially conical shape and consists of three layers, an outer covering 4 the lower part 7 of which has an aperture drilled in it to permit discharging, a refractory lining 6 and an insulating layer 5 between the outer covering and the lining. The lining has drilled in its lower part a conical recess 8 which receives a socket 9 in which a discharge aperture 10 is drilled. This socket has the same conical shape as the recess 8 and can therefore be wedged in the bottom of the crucible. The top end of the discharge aperture 10 has a part of greater diameter 11 which receives the asbestos pellet 12. In order to facilitate positioning of the asbestos pellet, the part 11 of the discharge aperture 10 is preferably provided with a chamfer on its upper part. The socket 9 can be of silica sand or other refractory material well known in aluminothermic processes, the same as the crucible.

When putting the device which has just been described into operation, it was found that in order to obtain good regularity of the discharging times it was necessary for the socket to extend past at least the upper part of the pellet, thus improving the heat transmission from the charge to the asbestos. The welding process using the preceding device is put into operation by known techniques. However, in this particular case it is necessary to take certain precautions: the asbestos pellet is first positioned in the socket before the latter is introduced into the crucible. If the closure between socket and crucible cannot be made tight as a result of wear on the crucible it is necessary to spread a little corundum on the circumference of the cylindrical hole 10. On the other hand it is necessary to ensure that there is no corundum on the top of the asbestos pellet so that the engagement of the closure is not disturbed.

FIG. 2 is a graph showing the variations in discharging time in seconds, plotted against the thickness of the pellet in millimeters. The tests were carried out with the crucible of FIG. 1 in which the scale is indicated by the fact that the overall height is 46 cms (including the cylindrical upper part 2). The asbestos pellets are obtained from board of 1100×1000 mm resulting from the overlaying of very fine layers of paste onto asbestos paper, these being deposited after the fibre has been softened in water by punching. The different thicknesses of the pellets necessary for the tests were obtained by wet glueing of two pellets followed by drying.

The charge used during these tests is an SO 80 charge containing:

| aluminum | 1 k 200 |
| iron oxides | 3 k 900 |
| cast and scrap iron | 910 g |
| other components | 170 g. |

Before discharging a fine white smoke appears below the crucible as a result of the progressive fusion of the closure. It seems that the smoke begins to be given off some seconds after the end of the reaction, during the decantation.

On the curve of FIG. 2 it can be seen that for the thicknesses of pellets of between 3 and 10 mm the discharging time, from the start of the reaction to the actual pouring, is a linear function of the thickness of the pellet. The points obtained in the course of these tests are easily reproducible and the dispersion is about 2 seconds either side of the mean point.

The usable range of pellet is between 3 and 8 mm which corresponds to an opening time of between 15 and 27 seconds. When the thickness of the pellet is too great, that is to say more than 12 mm, the opening time is too long. Since the metal is close to its solidifying point pouring is difficult and can even be incomplete. The temperature of the filler metal is not sufficient to melt the base metal faces to be welded.

The device according to FIG. 3 comprises a detachable socket 21 similar to the socket 9 previously described, and a closure 22. The discharge aperture 23 is drilled in the socket 21 along its axis, the upper end of the aperture having a part of greater diameter 24 serving as a seat for the improved closure. In order to facilitate positioning of the closure, the part with the greater diameter 24 of the socket 21 is preferably provided with a chamfer on its upper part. The closure 22 consists of an aluminium tube 25, cylindrical in shape, its diameter being substantially equal to that of the part 24 of the socket, the said cylinder resting on its flat base 26 in the part 24 of the socket. The asbestos pellet 27 is arranged at the bottom of the cylinder 25 and is covered by an aluminothermic mixture 28. The closure 22 is closed at its upper part 29 by crushing the aluminium tube 25.

FIG. 4 shows a crucible 30 of the type described in FIG. 1, having at its lower part the socket 21 provided with the closure 22. After the socket and the closure have been positioned the corundum powder 31 is spread between the lateral walls of the device 22 and the walls of the crucible 30, the positioning of the corundum powder 31 is facilitated by the shape of the upper part 29 of the closure 22, then the crucible 30 is filled with the aluminothermic mixture 32.

As regards thermic welding by itself, it is possible to use all the known classical processes.

What we claim as our invention and desire to secure by Letters Patent is:

1. A self-opening closure for the discharge aperture of a crucible containing an aluminothermic mixture for welding, the aperture having no tapping pin and being closed solely by said closure, the said closure comprising a pellet of a non-metallic solid which has good mechanical resistance, is not degassed by heating, has a thermal conductivity below 2 kcal/m.h.° C., and has a fusion temperature below 1600° C., and a chimney surmounting said pellet, said chimney containing an aluminothermic mixture and being positionable along with the pellet in the lower part of a crucible.

2. A closure according to claim 1, in which the chimney consists of a metal tube covering the solid pellet and filled with aluminothermic mixture.

3. A closure according to claim 2, in which the solid pellet is arranged at the bottom of the metal tube, the tube being filled with aluminothermic mixture and sealed at both ends.

4. A closure according to claim 3, in which the metal tube is made of aluminium and has a flat base on which the solid pellet rests.

5. A closure according to claim 4, in which the upper part of the metal tube is crushed closed.

* * * * *